April 24, 1928. R. F. MASSA. Re. 16,940
THERMOSTAT.
Original Filed Nov. 11, 1913
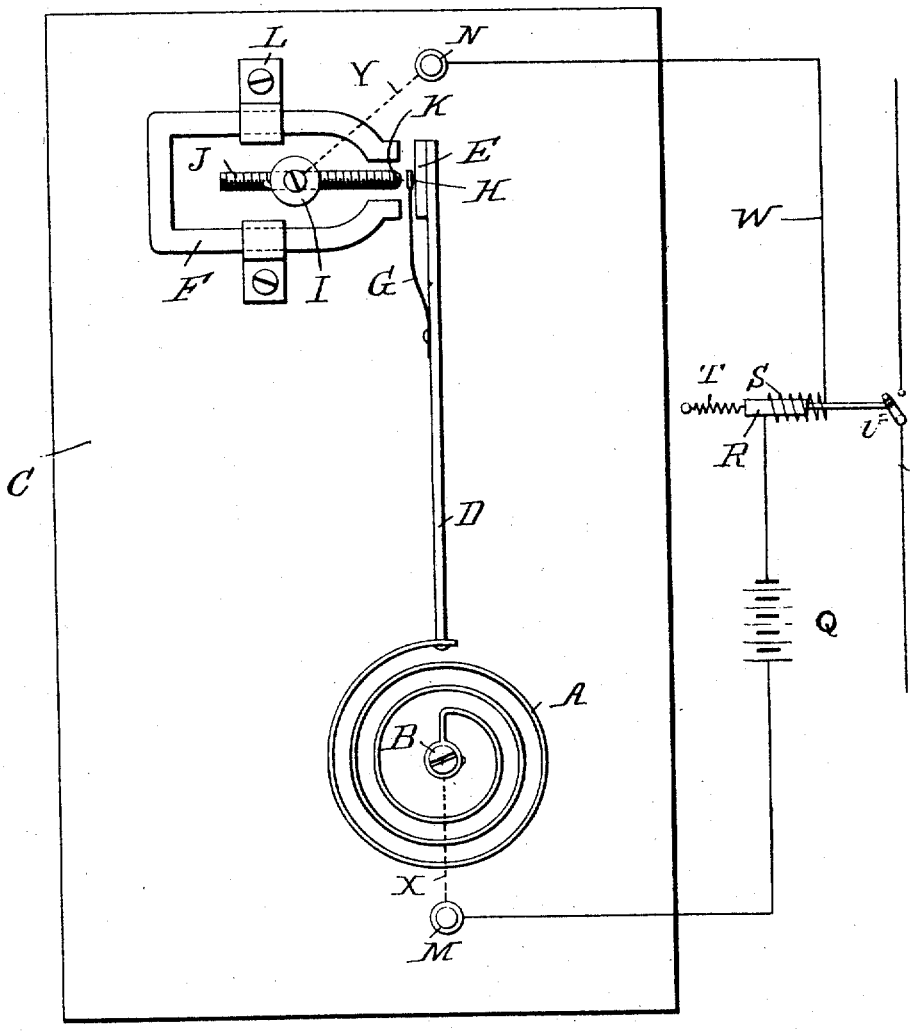
Witnesses:
M. G. Crawford
R. O. Kay.
Inventor
Robert F. Massa
By his Attorney
A. Parkhurst Reissued Apr. 24, 1928. Re. 16,940

UNITED STATES PATENT OFFICE.

ROBERT F. MASSA, OF NEW YORK, N. Y., ASSIGNOR, BY MESNE ASSIGNMENTS, TO RALPH PENN AND ALBERT PENN, BOTH OF DES MOINES, IOWA.

THERMOSTAT.

Original No. 1,146,637, dated July 13, 1915, Serial No. 800,398, filed November 11, 1913. Application for reissue filed January 9, 1928. Serial No. 245,614.

My invention relates to apparatus for automatically operating temperature controlling devices, and is specifically designed to produce a sensitive and positively acting thermostatic mechanism for alternatively opening and closing an electric circuit. The usual form of device for this purpose, in which a switch member is moved solely by a thermostatic member, is defective in that the action is slow and hesitating, and responsive only to considerable variations of temperature. The vacillating action of the device at critical temperatures produces an injurious sparking at contact points, and when magnets have been used to make the contact action more positive, they have interefered with the sensitiveness of the apparatus, the movable armature freezing to the magnet in certain positions of the thermostat.

My invention overcomes these difficulties by a special arrangement of magnetic field, armature and contact members such as illustrated in the accompanying drawing, which diagrammatically illustrates the best form of apparatus for embodying my invention at present known to me.

Referring to the drawing, A, is a thermostatic member formed in the usual way of two elastic strips of metals having different coefficients of expansion under heat, such as steel and brass, welded or otherwise fastened together and coiled into a spiral. The inner end of the spiral is rigidly fastened at B, to a non-conducting base, such as the slate slab C. The outer and free end of the spiral carries a bar D, to the outer end of which a soft iron armature E, and a light spring strip G, are attached. H, is a contact member formed of any non-corroding metal, carried by spring G.

F, is a magnet, preferably a permanent magnet of horse shoe form, held to base C, by clips L, L, so that the armature E, will move toward and from the center of the magnetic field of force as the coil A, unwinds or winds up under the action of varying temperature.

J, is a brass screw adjustably mounted in a pin, or other support on base C, and having a tip K, of material similar to H.

M, represents a binding screw set in base C, and electrically connected to movable contact member H, as by a wire X, indicated in dotted lines extending under base C, to pin B. Another binding screw N, is electrically connected to stationary contact member K, as by wire Y, indicated in dotted lines, extending under base C, to pin I. Any suitable work circuit is indicated at W, including a source of current, Q, and a translating device, such as motor S.

Such being the arrangement of the apparatus, the operation is as follows: Assuming that S, is a solenoid having a core R, normally pulled out by spring T, and connected to a switch U, which controls the motor circuit of a refrigerating machine (not shown) and that said refrigerating machine controls the temperature in the room where the thermostatic member A, is placed, the supporting pin B, is so adjusted that when the desired temperature exists in the room, the armature E, will be located in the weaker outer zone of the magnetic field created by the magnet F, and the contacts H, and K, will be separated. The circuit W, will thus be open and the core R, of solenoid S, extended by spring T, to open the switch U. The thermostatic member A, is then so adjusted that upon a slight rise of temperature the coil A, will unwind (or expand) sufficiently to move armature E, into the more intense zone of the magnetic field of varied intensity produced by magnet F. Thereupon the increased magnetic attraction promptly pulls the armature farther toward the magnet until contact members H, and K, meet and close the circuit. The solenoid S, is then thrown into operation to close the switch and the refrigerating apparatus (not shown) reduces the temperature to the predetermined point. Thereupon the elastic tension of the spiral A, which has been produced by the flexing of the spiral when the armature was pulled over by the magnet, is increased by its tendency to contract under the influence of the lower temperature, and when the magnetic attraction is overpowered by this elastic pull of spiral A, and that of the spring G, the armature moves out into the weaker portion of the field. Thereupon the elastic stress promptly overcomes what is left of the magnetic pull, and the armature moves quickly to a farther distance sufficient to separate contacts H, and K. At the critical temperature there is a wavering or vacillating of the armature E, but no sparking occurs, as the spring G, keeps the contacts together. Before the armature moves far enough to open the circuit it has reached such a weak zone of the magnetic field that the elastic tension of A, pulls it quickly away and the break between the contact members is quick and positive. When the circuit is opened the solenoid becomes dead, spring R, pulls the core T, out, opening switch U, and the refrigerating machine stops until a slight rise of temperature again causes the armature to approach the center of intensity of the magnetic field and the operation first above described is repeated.

With my invention I am able to reduce the range of temperature variation to half a degree Fahrenheit, and by eliminating all sparking I produce a thermostat which will operate indefinitely without substantial deterioration. As the armature never quite touches the magnet poles, there is no opportunity for it to "freeze" thereto, and produce the irregular action, resulting from such "freezing".

Another advantage of my invention arises from the fact that by adjusting the brass screw J, which cooperates with the spring G, the degree of sensitiveness of the instrument can be varied so that it will respond to a minimum change of temperature, or permit a wider variation without setting the apparatus in motion. Also adjustment of the relative positions of the magnet and the thermostatic member, determines the temperature at which the apparatus will operate.

Of course other forms of magnet or magnetic field, thermostatic members and contact members, could be substituted for those illustrated, without necessarily departing from the principle of my invention as above explained. So long as a magnet and armature, one of which is fixed and the other movable, are employed with a spring contact to prevent chattering, the other element of the structure illustrated may be modified in many ways to suit varying conditions or requirements.

Having described my invention, I claim:

1. In an automatic temperature controlling device the combination of a flexible, elastic thermostatic member, rigidly fastened at one point, an armature carried on said thermostatic member at another point, a magnetic field of varied intensity located within the line of travel of the armature when moved by the effect of varying temperature on the thermostatic member, a contact member located near the point of greatest intensity of the field and a cooperating contact member carried by the thermostatic member.

2. In an automatic temperature controlling device the combination of a flexible, elastic thermostatic member, rigidly fastened at one point, an armature carried on said thermostatic member at another point, a magnetic field of varied intensity located within the line of travel of the armature when moved by the effect of varying temperature on the thermostatic member, a contact member located near the point of greatest intensity of the field and a cooperating spring supported contact member carried by the thermostatic member.

3. In an automatic temperature controlling device the combination of a spirally coiled thermostatic member held rigidly at that end which forms the center of the coil, an armature and a yielding contact member carried by the free end of the thermostatic member, a permanent magnet so located that the armature approaches its poles when the thermostatic member moves in one direction and an adjustable stationary contact member so located that the other contact member touches it when the armature nearly touches the magnet poles.

4. In an automatic temperature controlling device the combination with a thermostatic member adapted to be flexed by variations of temperature and rigidly fastened at one end, of an armature and a contact member carried by the movable portion of said thermostatic member and a stationary magnetic field of varied intensity into and out of which the armature may be carried by flexure of the thermostatic member, a stationary contact member so located as to touch the moving contact member only when the armature approaches the point of greatest intensity of the magnetic field.

5. In an automatic temperature controlling device the combination of a magnetic field of varied intensity, a movable armature, a thermostatic member adapted to move said armature toward and from the center of intensity of said field, a movable contact member operatively connected to said armature and a stationary contact member so located as to touch the movable contact member only when the armature approaches the center of intensity of said field.

6. In a thermostatic device for controlling an electric circuit, the combination of a stationary magnet, a movable thermostatically controlled armature, a stationary contact member, and a movable contact member operatively connected to the armature and adapted to strike the stationary contact member when the armature approaches the magnet poles, and prevent its further motion toward and contact with said poles.

7. In a thermostatic device for controlling an electric circuit, the combination of a stationary magnet, a movable thermostatically controlled armature, a stationary contact member, and an elastic contact member carried by the armature and adapted to strike the stationary contact member when the armature approaches the magnet poles, and prevent its further motion toward and contact with said poles.

8. In an automatic temperature controlling device the combination of a thermostatic member, an armature controlled by said thermostatic member, a magnetic field of varied intensity located in the line of travel of the armature when moved by reason of temperature changes, a contact member independent of the thermostatic element, and a cooperating contact member controlled by the armature, at least one of said contact members being elastically mounted with reference to both magnet and armature.

9. In an automatic temperature controlling device the combination of a magnet and armature movable one with reference to the other, a thermostatic member having a motion controlling connection with one of the two first mentioned elements, and two contact members, one of which is movable by the thermostatically controlled member, at least one of said contact members being elastically mounted with reference to both magnet and armature.

10. In an automatic temperature controlling device the combination of a magnet and armature movable one with reference to the other, a thermostatic member having a motion controlling connection with one of the two first mentioned elements, and means for adjusting the normal relative positions of said thermostatic member and the stationary element, together with two contact members, one of which is movable by the thermostatic member, at least one of said contact members being elastically mounted with reference to both magnet and armature.

11. In an automatic temperature controlling device the combination of a magnet and armature movable one with reference to the other, a thermostatic member having a motion controlling connection with one of the two first mentioned elements, and means for adjusting the normal relative positions of said thermostatic member and the stationary element, together with two contact members, one of which is elastically mounted on the thermostatic member, while the other has an adjustable stationary mounting.

ROBERT F. MASSA.